US012632787B2

(12) United States Patent
Randle-Conde

(10) Patent No.: US 12,632,787 B2
(45) Date of Patent: May 19, 2026

(54) SYSTEMS AND METHODS FOR TRAINING MACHINE LEARNING MODELS USING GENERATED FACETED MODELS

(71) Applicant: Hanzo Archives Inc., New York, NY (US)

(72) Inventor: Aidan Sean Randle-Conde, Leeds (GB)

(73) Assignee: HANZO ARCHIVES INC., New York, NY (US)

( * ) Notice: Subject to any disclaimer, the term of this patent is extended or adjusted under 35 U.S.C. 154(b) by 728 days.

(21) Appl. No.: 18/067,802

(22) Filed: Dec. 19, 2022

(65) Prior Publication Data

US 2023/0206120 A1     Jun. 29, 2023

Related U.S. Application Data

(60) Provisional application No. 63/293,684, filed on Dec. 24, 2021.

(51) Int. Cl.
*G06N 20/00* (2019.01)

(52) U.S. Cl.
CPC .................................... *G06N 20/00* (2019.01)

(58) Field of Classification Search
CPC ....... G06N 20/00; H04L 51/21; H04L 51/212; H04L 63/1425
See application file for complete search history.

(56) References Cited

U.S. PATENT DOCUMENTS

| 8,712,929 | B1 * | 4/2014 | Bickford | ................ | G06Q 50/06 |
| | | | | | 700/286 |
| 2018/0081912 | A1 * | 3/2018 | Suleiman | .............. | G06F 16/215 |

FOREIGN PATENT DOCUMENTS

WO     WO-2018222308 A1 * 12/2018     ............. G06N 20/00

* cited by examiner

*Primary Examiner* — Schyler S Sanks
(74) *Attorney, Agent, or Firm* — Oliff PLC

(57) ABSTRACT

A system and method for training machine learning models using generated faceted models. A faceted model is trained using a hybrid dataset, which is defined by selecting records from a data source according to a faceting strategy. For example, a user may train a faceted model to be applied to records from a data source in a defined time window. The hybrid dataset can be defined by a time based faceting strategy, where records are selected for the hybrid dataset from the same data source, but outside of the time window. The faceted model is enriched by records from the same data source that are not overlapping with the facets that define the subset of the data source where the model will be applied.

20 Claims, 12 Drawing Sheets

100

Computer network 116

Figure 1:
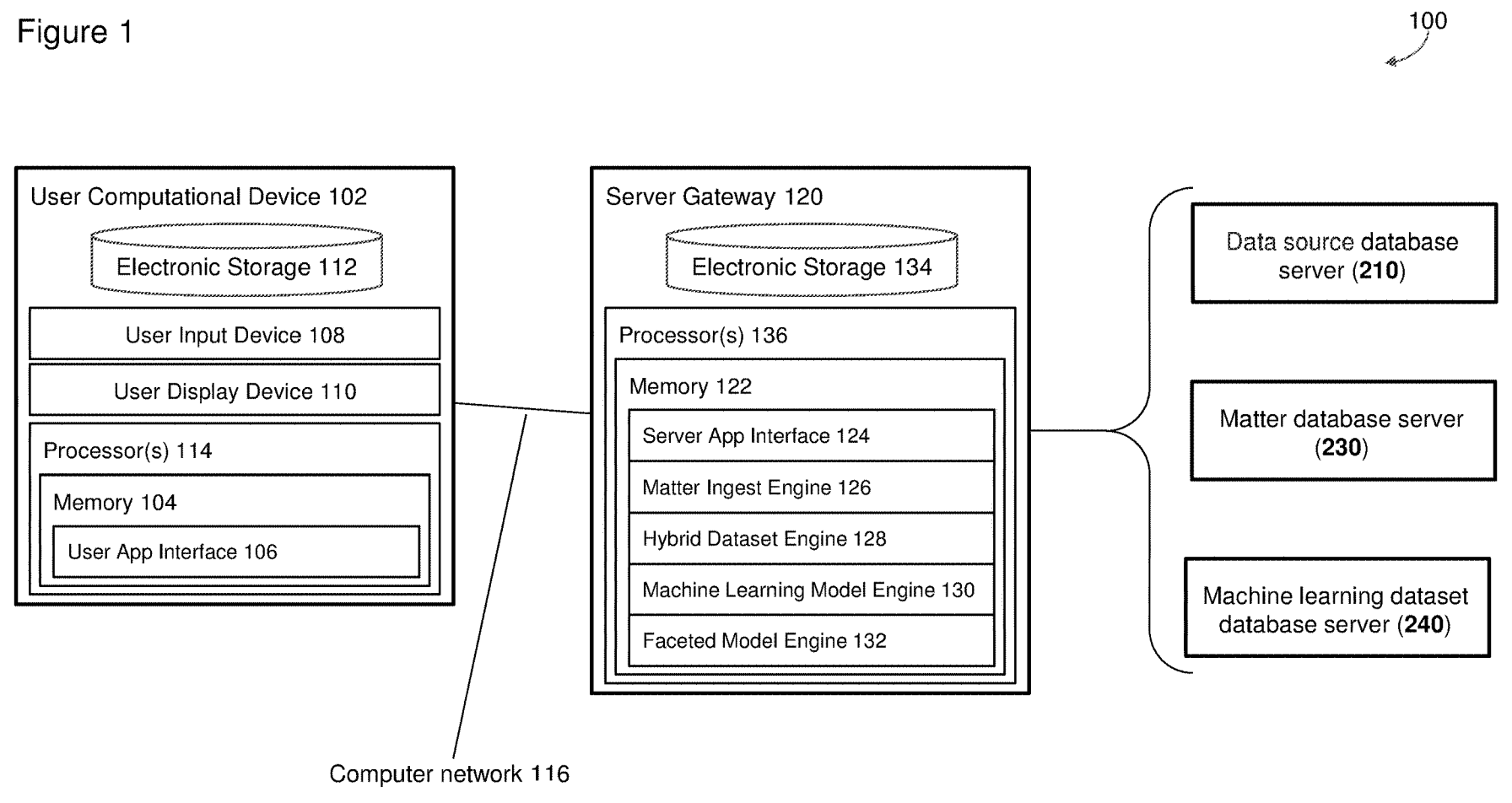

Data source database server (210)

Matter database server (230)

Machine learning dataset database server (240)

Server Gateway 120

Electronic Storage 134

Processor(s) 136

Memory 122

Server App Interface 124

Matter Ingest Engine 126

Hybrid Dataset Engine 128

Machine Learning Model Engine 130

Faceted Model Engine 132

Computer network 116

User Computational Device 102

Electronic Storage 112

User Input Device 108

User Display Device 110

Processor(s) 114

Memory 104

User App Interface 106

200A

Data source database server (210)

Electronic Storage (212)

Matter ingest server (220)

Machine learning dataset database server (240)

Electronic Storage (242)

Matter database server (230)

Electronic Storage (232)

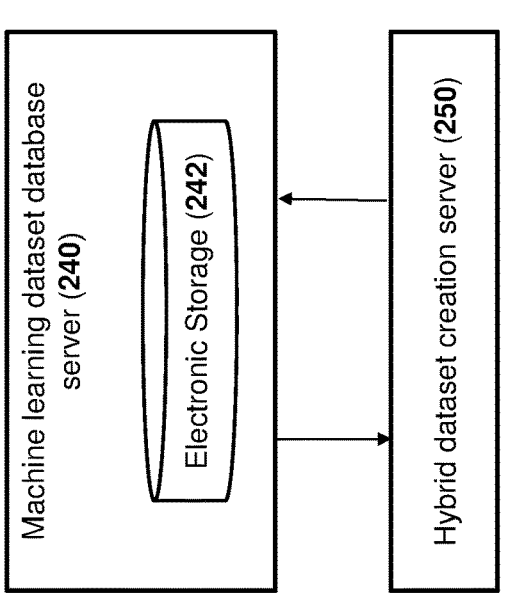
Figure 2B

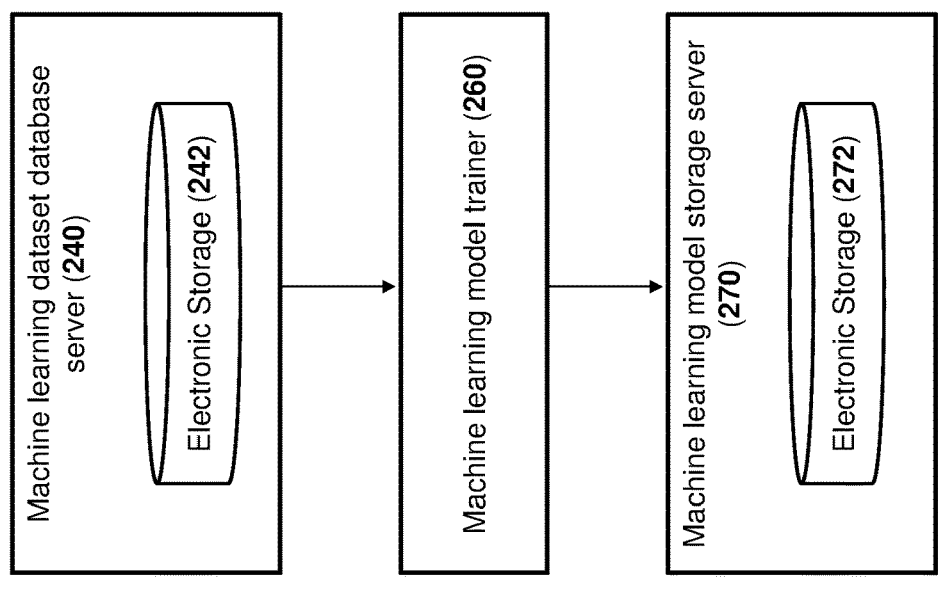
Figure 2C

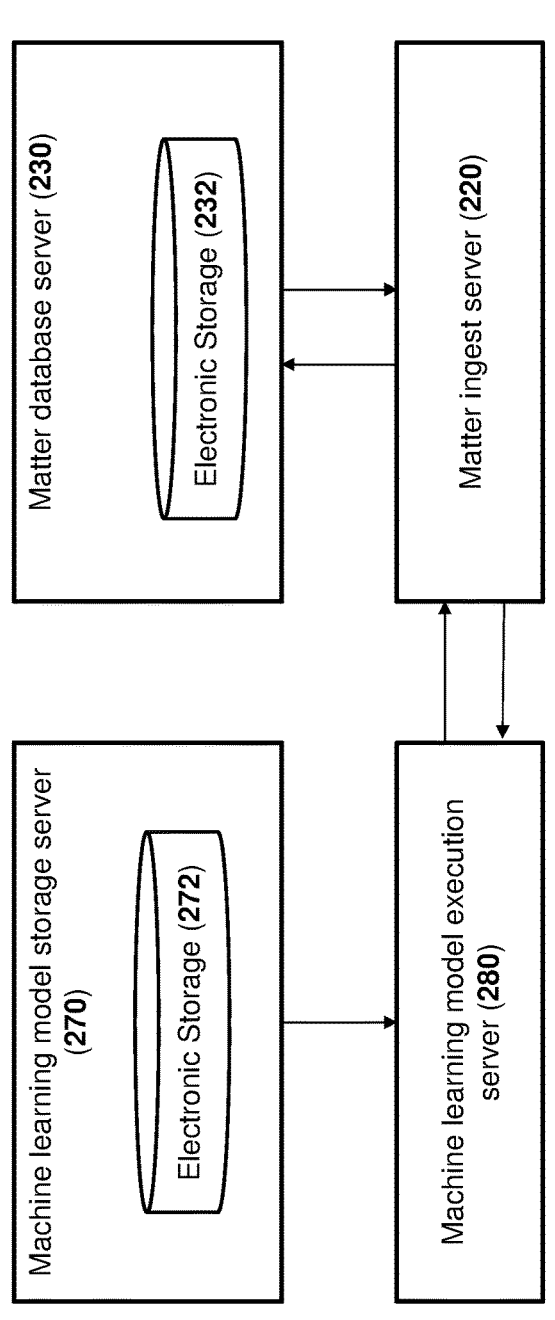
Figure 2D

300A
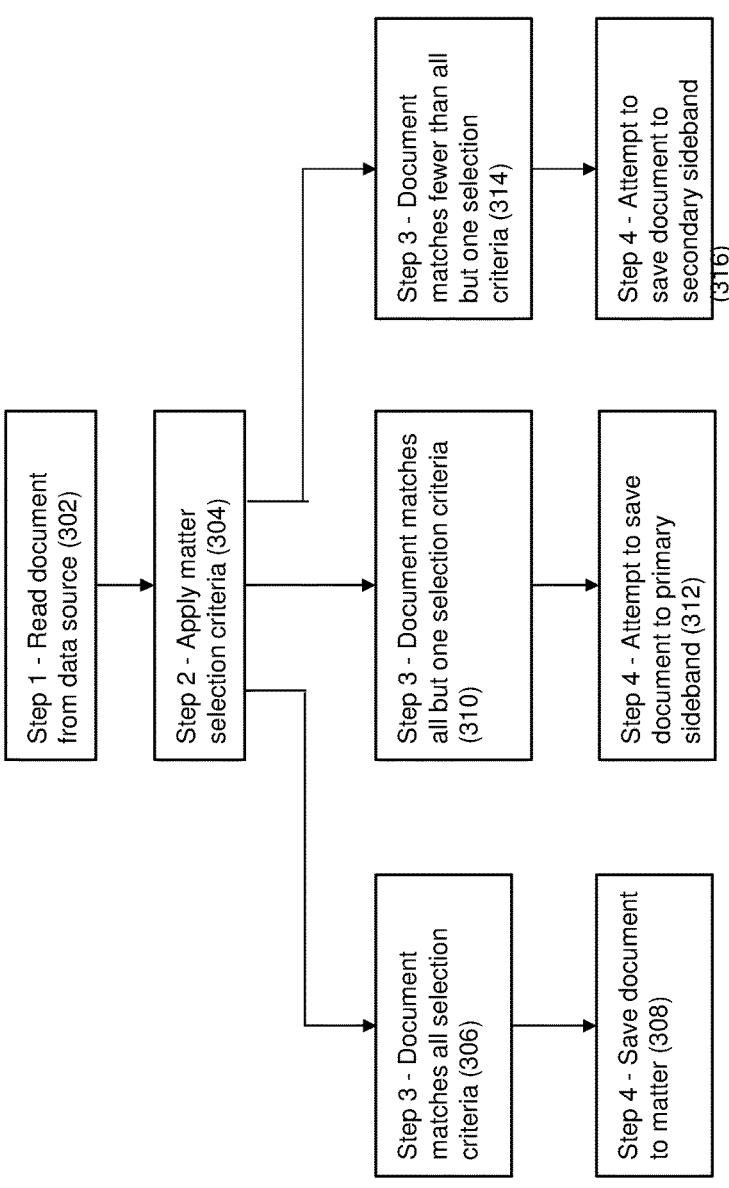
Figure 3A

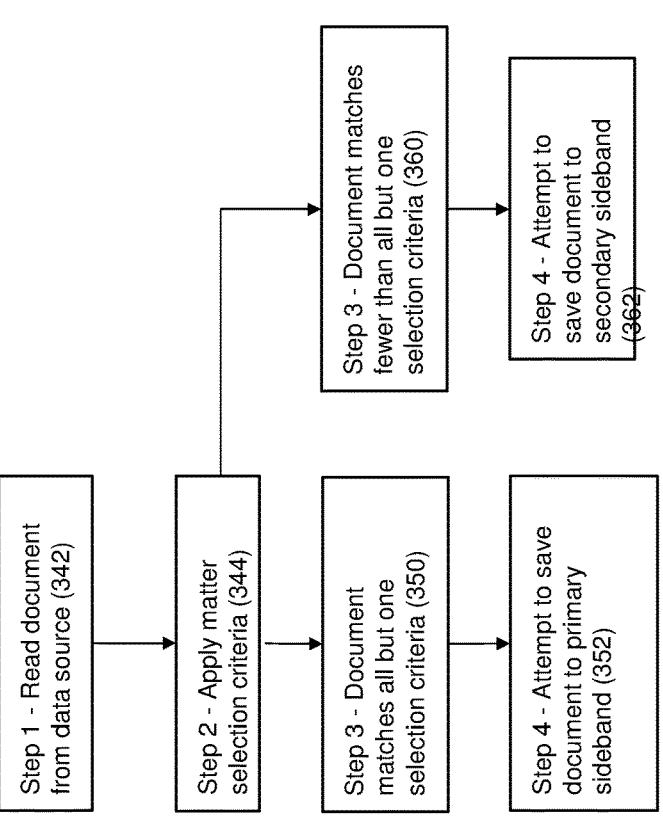
Step 1 - Read document from data source (342)
Step 2 - Apply matter selection criteria (344)
Step 3 - Document matches all but one selection criteria (350)
Step 4 - Attempt to save document to primary sideband (352)
Step 3 - Document matches fewer than all but one selection criteria (360)
Step 4 - Attempt to save document to secondary sideband (362)
300B
Figure 3B

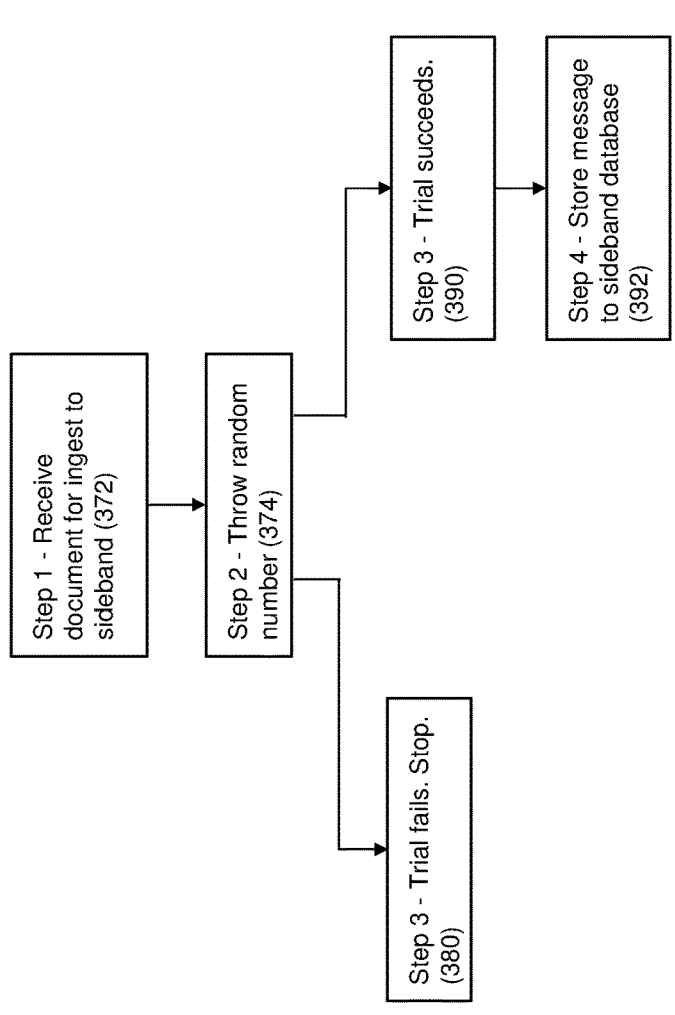
Figure 3C

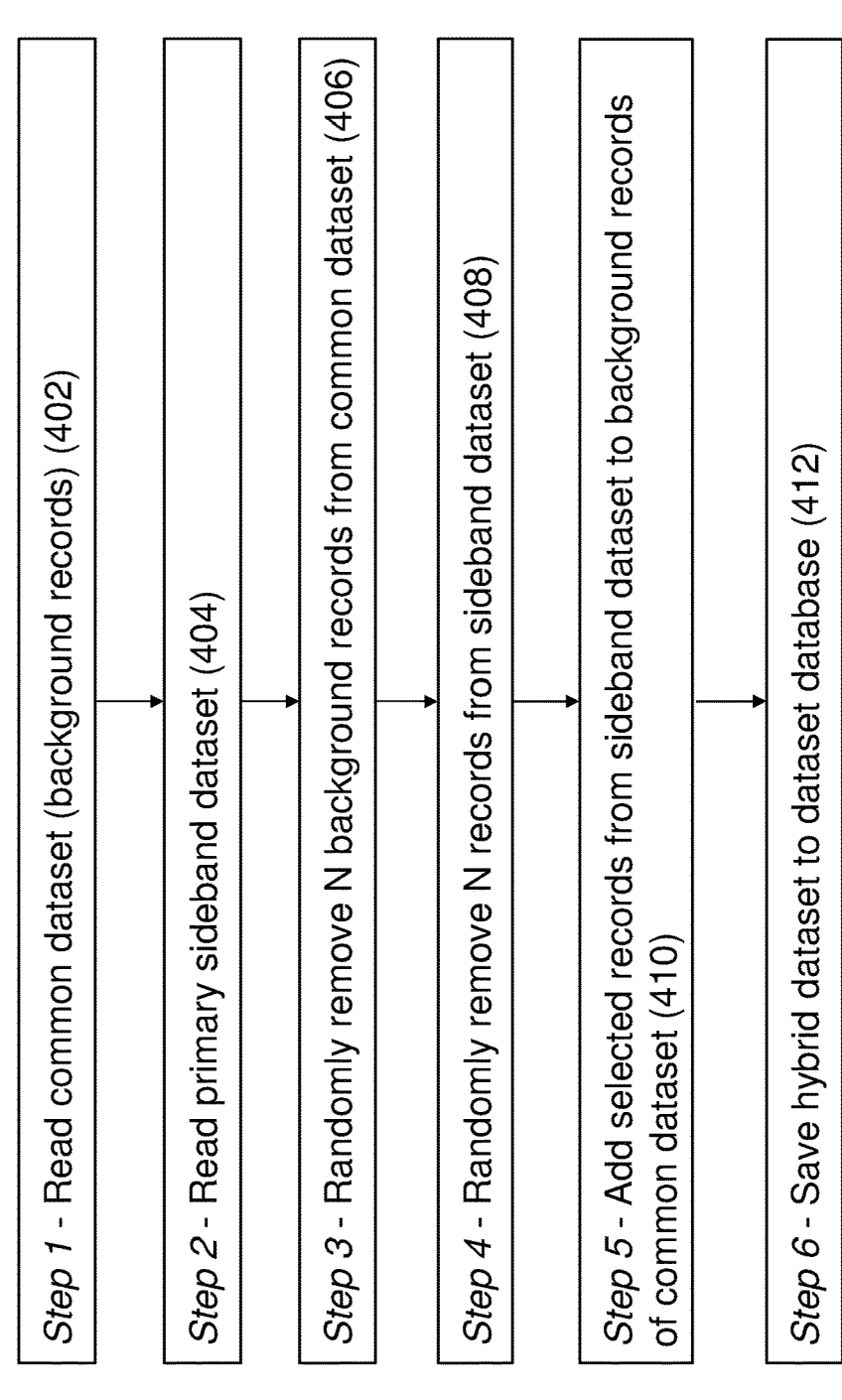
Step 1 - Read common dataset (background records) (402)
Step 2 - Read primary sideband dataset (404)
Step 3 - Randomly remove N background records from common dataset (406)
Step 4 - Randomly remove N records from sideband dataset (408)
Step 5 - Add selected records from sideband dataset to background records of common dataset (410)
Step 6 - Save hybrid dataset to dataset database (412)
Figure 4A

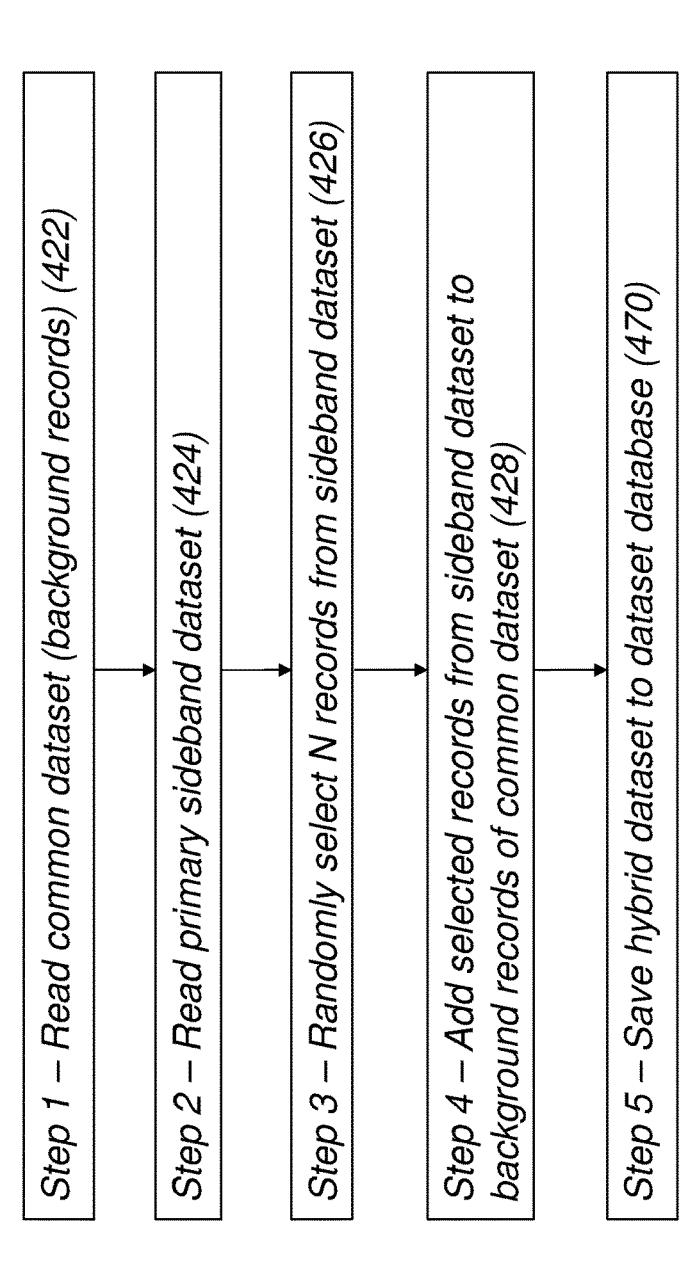
Figure 4B
400B
Step 1 – Read common dataset (background records) (422)
Step 2 – Read primary sideband dataset (424)
Step 3 – Randomly select N records from sideband dataset (426)
Step 4 – Add selected records from sideband dataset to background records of common dataset (428)
Step 5 – Save hybrid dataset to dataset database (470)

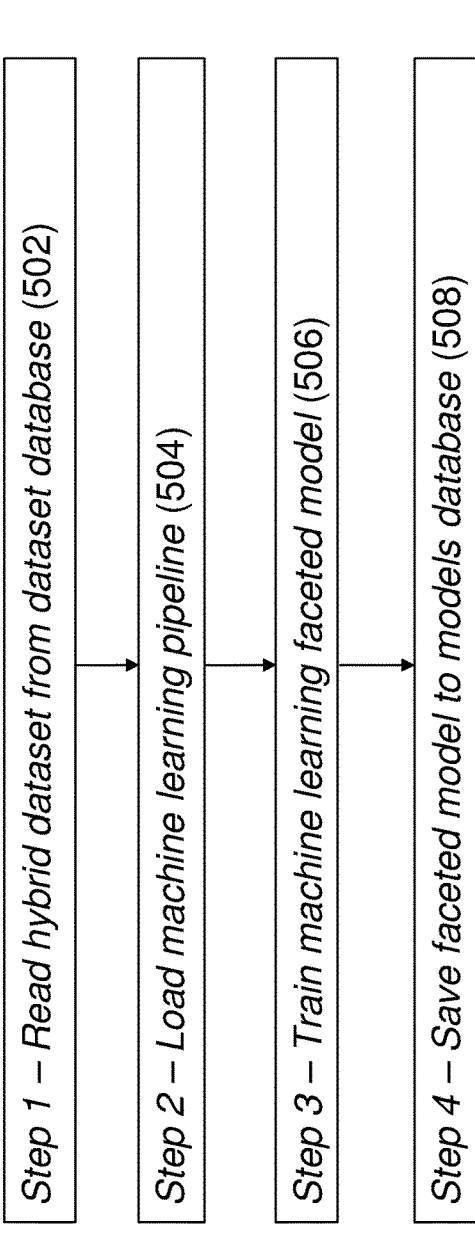
Figure 5
Step 1 – Read hybrid dataset from dataset database (502)
Step 2 – Load machine learning pipeline (504)
Step 3 – Train machine learning faceted model (506)
Step 4 – Save faceted model to models database (508)

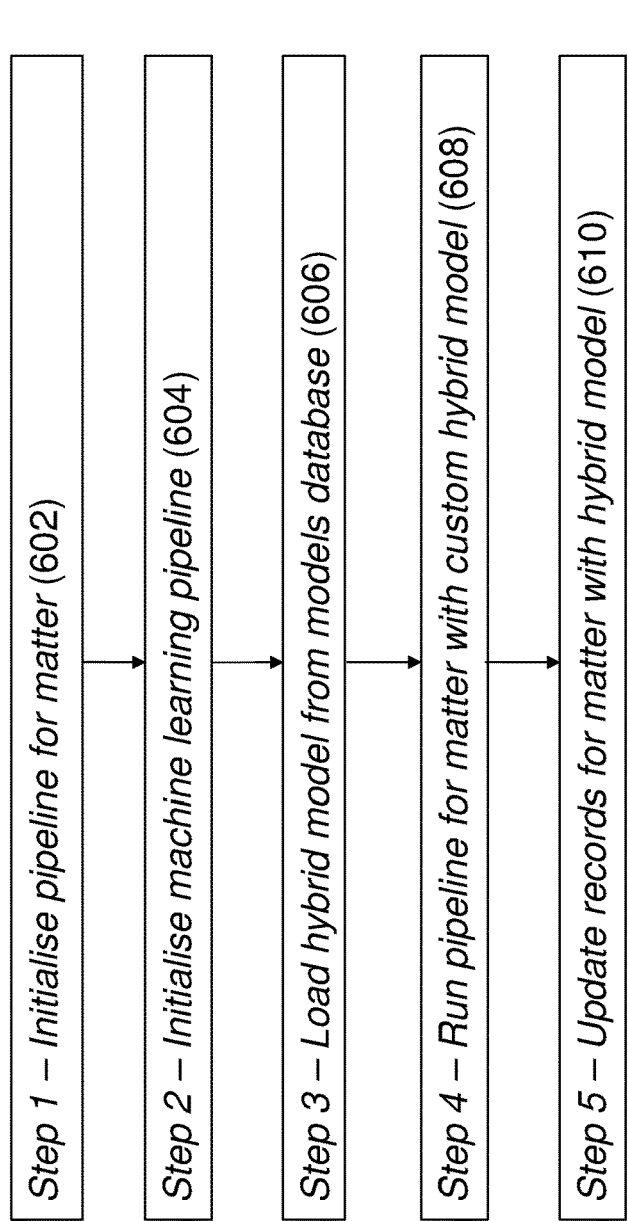
Figure 6
600
Step 1 – Initialise pipeline for matter (602)
Step 2 – Initialise machine learning pipeline (604)
Step 3 – Load hybrid model from models database (606)
Step 4 – Run pipeline for matter with custom hybrid model (608)
Step 5 – Update records for matter with hybrid model (610)

SYSTEMS AND METHODS FOR TRAINING MACHINE LEARNING MODELS USING GENERATED FACETED MODELS

FIELD OF THE DISCLOSURE

The present disclosure relates to systems and methods for training machine learning methods using generated faceted model dataset.

BACKGROUND

Traditionally, a machine learning (ML) model is trained using a dataset, and then the model is applied to records from a data source for classification or regression. This means that one model is applied to all data sources. If the training dataset is not similar to a data source, the results for that data source can be suboptimal or surprising. Additionally, a user may be more tolerant of high scores in one data source than another, meaning a single model may not be suitable for use with multiple data sources.

To illustrate the above issue, consider the use case where a user wants to find examples of threatening language. The user has access to a pre-trained model and the dataset used to train that model. The user defines a matter (a subset of the data source) and selects messages scoring above a threshold for the model. This returns a list of messages which can be considered to contain threatening language, according to the model. Such messages may include the word "kill", as the training dataset could include phrases such as "I will kill you" as an example of threatening language. However, if the data source being considered is from a technical organization, the phrase "I will kill the server" might be a legitimate, non-threatening message, which indicates that a person wishes to power down a piece of hardware. There is not an obvious way to separate out these two uses of the word "kill" with the model and dataset as they are. Thus, what is needed is a system and method for training machine learning models that incorporates records from the data source.

SUMMARY

One aspect of the present invention relates to systems and methods for training machine learning models using generated faceted models. A faceted model is trained using a hybrid dataset, which is defined by selecting records from a data source according to a faceting strategy. For example, a user may train a faceted model to be applied to records from a data source in a defined time window. As a non-limiting example, the hybrid dataset can be defined by a time based faceting strategy, where records are selected for the hybrid dataset from the same data source, but outside of the time window of the records to be analyzed. Multiple faceting strategies are possible and may be employed individually or in combination. Such faceting strategies determine the data selected, by setting one or more parameters for selecting records. Preferably, the records selected do not correspond to the records to be analyzed. Without wishing to be limited by a closed list, the selection may be scoped by time, channel (within a particular communication medium, and/or between communication media), by subject matter, or by person.

Scoping by time relates to selecting records for the hybrid dataset according to a particular time period or time window.

Non-limiting examples of communication media include chat and messaging software, emails, letters sent on paper or other hard (physical) media, and recordings and/or transcripts of voice communication (such as telephone or Skype calls, and/or software for supporting remote meetings such as zoom for example).

Examples of chat and messaging software include but are not limited to Slack, WhatsApp, WeChat, Microsoft Teams, Google Chat, Facebook Messenger, Signal, Telegram, direct messaging functions within social media platforms (including but not limited to Instagram and Twitter), and software supporting SMS (short message service) messages.

For communication media which permit channels, group messages and/or threads, including but not limited to emails and/or the above chat and messaging software (where appropriate), the selection may be further based according to one or more of such channels, message groups and/or threads.

Selection may also be made according to a particular person, as a recipient and/or sender of such communication. For example, the selection may be made to include all interactions involving "Bob Smith".

Selection by subject matter may be made according to keywords, topic modeling and/or by training an AI model to recognize a particular subject.

In any case, the communication media may be public or private. "Public" in this sense may relate to communication media available to the general public and/or to communication media available to a group within a company or organization. It may be desirable to exclude public channels from the scope of the records to be selected according to the selection strategy. Studies show that messages are more likely to score high on an unwanted behavior model in a direct message (or multi party direct message) compared to a public channel within a communication medium.

The faceted model is enriched by records from the same data source, but that do not overlap with the facets that define the subset of the data source where the model will be applied. For example, as noted above, the selection strategy preferably enables records to be selected that are not intended to be analyzed by the trained model.

The records, such as messages, are selected according to the above criteria and are then tagged. The tagged messages are stored in a repository. Optionally the tags are divided into a plurality of sets, in each set is used to train a particular AI model. Preferably a plurality of such models are trained on different sets of records.

If additional records are to be included, for example if different and/or additional selection criteria are applied to determine the scope of the selected records, then it is necessary to label these additional and/or replacement records. The model is then retrained on the expanded and/or different set of records.

Optionally, tagged records are reviewed by a domain expert for content. For example, vocabulary words in one domain may have a different meaning in a different domain. Different domains may therefore have very different vocabularies. For example, threatening language in one domain may not be considered threatening language in another domain. For example, a software based company may include the message "Please kill the server if it is not already dead", which could return a false positive for a threat detection model. In another context, the words "kill" and "dead" could be reasonably be considered a threat.

Also optionally, tagged records may be reviewed by the providing company or organization, for further analysis of the content. Such a further analysis may be applied to account for the culture and/or language that may be specific to the providing company or organization, and not only to an industry or domain.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions. The processor is configured to execute a predefined set of operations in response to receiving a corresponding instruction selected from a predefined native instruction set of codes.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions-which can be a set of instructions, an application, software-which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 1 illustrates a system for training machine learning models using hybrid datasets, in accordance with one or more implementations.

FIG. 2B illustrates a hybrid dataset creation system, in accordance with one or more implementations.

FIG. 2C illustrates a hybrid model training system, in accordance with one or more implementations.

FIG. 2D illustrates a hybrid model application system, in accordance with one or more implementations.

FIG. 3A illustrates a method for separating documents into matter and sidebands, in accordance with one or more implementations.

FIG. 3B illustrates a method for separating documents into sidebands, in accordance with one or more implementations.

FIG. 3C illustrates a method for populating sidebands documents, in accordance with one or more implementations.

FIG. 4A illustrates a method for creating a hybrid dataset with substitution, in accordance with one or more implementations.

FIG. 4B illustrates a method for creating a hybrid dataset with addition, in accordance with one or more implementations.

FIG. 5 illustrates a method for training a faceted model, in accordance with one or more implementations.

FIG. 6 illustrates a method for running a faceted model for a matter, in accordance with one or more implementations.

DETAILED DESCRIPTION

Figure 2A:
FIG. 2A illustrates a data ingest system for processing data, in accordance with one or more implementations.

FIG. 1 illustrates a system for training machine learning models using hybrid datasets, in accordance with one or more implementations. In some implementations, system 100 may include a user computational device 102, server gateway 120, and one or more database servers, such as a data source database server 210, matter database server 230, and machine learning dataset database server 240.

User computational device 102 and server gateway 120 may be operatively linked via one or more electronic communication links. For example, such electronic communication links may be established, at least in part, via a network such as the Internet and/or other networks. Server gateway 120 and any of the databases may also be operatively linked via one or more electronic communications links. It will be appreciated that this is not intended to be limiting, and that the scope of this disclosure includes implementations in which user computational device 102, server gateway 120, data source database server 210, matter database 230, and machine learning dataset database 240 may be operatively linked via some other communication media.

User computational device 102 may include user input device 108, user display device 110, electronic storage 112, one or more processor(s) 114, and/or other components. Examples of user computational device 102 may include, but not limited to, one or more of a desktop computer, a laptop computer, a handheld computer, a tablet computing platform, a mobile device, a smartphone, a smart watch, a smart television, and/or other like devices.

User input device 108 may be configured to allow a user to interact with the user computational device 102. Non-limiting examples of a user input device 108 are a keyboard, mouse, other pointing device, touchscreen, and the like.

User display device 110 may be configured to display information to the user. Non-limiting examples of a user display device 110 are computer monitor, touchscreen, and the like. User input device 108 and user display device 110 may optionally be combined to a touchscreen, for example.

Electronic storage 112 may comprise non-transitory storage media that electronically stores information. The electronic storage media of electronic storage 112 may include one or both of system storage that is provided integrally (i.e., substantially non-removable) with a respective component of system 100 and/or removable storage that is removably connected to a respective component of system 100 via, for example a port (e.g., a USB port, a firewire port, etc.) or a drive (e.g., a disk drive, etc.). Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 114, and/or other information that enables components of a system 100 to function as described herein.

Processor(s) 114 may be configured to provide information processing capabilities in user computational device 120. As such, processor(s) 114 may include a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory.

Although processor(s) 114 is shown in FIG. 1 as a single entity, this is for illustrative purposes only. In some implementations, processor(s) 114 may include a plurality of processing units. These processing units may be physically located within the same device, or processor(s) 114 may represent processing functionally of a plurality of devices operating in coordination. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Processor(s) 114 is configured to execute machine-readable instructions stored in a memory 104. Machine-readable instructions stored in memory 104 include a user app interface 106 and/or components. User app interface 106 provides a user interface presented via the user computational device 102. User app interface 106 may be a graphical user interface (GUI). The user interface may provide information to the user. In some implementations, the user interface may present information associated with one or more user requests. The user interface may receive information from the user. In some implementations, the user interface may receive user instructions to perform a query or function. The user instructions may include, but not limited to, a selection of one or more filtering criteria, one or more query for specific data, a command to train machine learning model using hybrid datasets, and communication with server gateway 120.

Referring now to server gateway 120 depicted in FIG. 1, server gateway 120 communicates with user computational device 102 and with a plurality of databases. Server gateway 120 may include electronic storage 134, one or more processor(s) 136, and/or other components. Server gateway 120 may include communication lines, or ports to enable the exchange of information with a network and/or other computing platforms. Illustration of server gateway 120 in FIG. 1 is not intended to be limiting. Server gateway 120 may include a plurality of hardware, software, and/or firmware components operating together to provide the functionality attributed herein to server gateway 120. For example, server gateway 120 may be implemented by a cloud of computing platforms operating together as server gateway 120.

Electronic storage 134 may comprise non-transitory storage media that electronically stores information. The electronic storage media of electronic storage 134 may include one or both of system storage that is provided integrally (i.e., substantially non-removable) with server gateway 120 and/ or removable storage that is removably connectable to server gateway 120 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) accessed through server gateway 120, and/or other information that enables components of a system 100 to function as described herein.

Processor(s) 136 may be configured to provide information processing capabilities in server gateway 120. As such, processor(s) 136 may include a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionally of a plurality of devices operating in coordination. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Processor(s) 136 may be configured by machine-readable instructions stored in a memory 122. Machine-readable instructions stored in memory 122 may include one or more instruction modules. The instruction modules may include computer program modules. The instruction modules may include one or more of server app interface 124, matter ingest engine 126, hybrid dataset engine 128, machine learning model engine 130, faceted model engine 132, and/or other instruction modules.

Server app interface 124 may be configured to communicate with one or more user computational devices via computer network 116.

Matter ingest engine 126 may be configured to receive and transmit data from one or more databases, for example data source database server 210, matter database server 230, and machine learning dataset database server 240. The data may be, but not limited to, documents, audio files, videos files, and images files. Matter ingest engine 126 may be configured to communicate with hybrid dataset engine 128 and machine learning model engine 130.

Matter ingest engine 126 may also be configured to apply filtering, such as matter selection criteria, to the data to create filter data, where the data may be in the forms of documents obtained from the data source database server 210. The matter selection criteria may comprise (1) documents that match all selection criteria, (2) documents that match all but one selection criteria, or (3) documents that match fewer than all but one selection criteria. Once the data is filtered, the data is saved to a database, such as the matter database server 230.

Hybrid dataset engine 128 may be configured to create a hybrid dataset using a substitution method or addition method. Hybrid dataset engine 128 reads data from the data source database server 210 and the matter database server 230, where the data may be filtered according to matter selection criteria. Under the substitution method, the hybrid dataset engine 128 removes N records from data source database server 210, selects N records from the matter database server 230, and then replaces the N records from data source database server 210 with the N records from the matter database to create a hybrid dataset. Under the addition method, the hybrid dataset engine 128 selects N records from the matter database server 230 and adds those records to records read from data source database server 210 to create a hybrid dataset. In both substitution and addition methods, hybrid dataset engine 128 saves the hybrid dataset in a database, such as machine learning dataset database server 240. This hybrid dataset may be used by machine learning model engine 130 to train a machine learning model.

Machine learning model engine 130 may be configured to train a faceted machine learning model. The faceted model is a machine learning model trained on the hybrid dataset. The machine learning model may include, but not limited to, classification models, regression models, clustering, dimensionality reduction, and deep learning. After the faceted model is trained, the faceted model is saved in a database, such as machine learning dataset database server 240.

Faceted model engine 132 may be configured to apply the faceted model to a user query to produce responsive data (i.e., documents) pursuant to the user's query. Faceted model engine 132 obtains the model from a database, such as a machine learning database, and then applies the model to the user's query or request. The user's query or request may be made for example through user app interface 106 of user computational device 120. The faceted machine learning model may analyze one or more records, according to a real time request made through user app interface 106 and/or as part of ongoing monitoring. For example, the user may request ongoing monitoring of records generated by one or more communication media, through user app interface 106. After faceted machine learning model analyzes the records, it may issue a warning to the user, for example through user app interface 106. Such a warning may relate to content that is illegal, unethical, against company policy or a combination thereof. The faceted machine learning model may output a warning in regard to such flagged content.

Processor(s) 136 may be configured to execute machine-readable instructions stored in memory 122. The machine-readable instructions stored in memory 122 may include machine-readable instruction components 124, 126, 128, 130, 132, and/or other machine readable instruction components. Processor(s) 136 may be configured to execute machine-readable instruction components 124, 126, 128, 130, 132, and/or other machine readable instruction components by software; hardware; firmware; some combination of software, hardware, and/or firmware; and/or other mechanisms for configuring processing capabilities on processor(s) 136. As used herein, the term "machine-readable instruction component" may refer to any component or set of components that perform the functionality attributed to the machine-readable instruction component. This may include one or more physical processors during execution or processor readable instructions, the processor readable instructions, circuitry, hardware, storage media, or any other components.

It should be appreciated that although machine-readable instruction components 124, 126, 128, 130, and 132 are illustrated in FIG. 1 as being implemented within a single processing unit, in implementations in which processor(s) 136 includes multiple processing units, one or more of components 108, 110, 112, and/or 114 may be implemented remotely from the other components. The description of the functionality provided by the different components 124, 126, 128, 130, and/or 132 described below is for illustrative purposes, and is not intended to be limiting, as any of components 124, 126, 128, 130, and/or 132 may provide more or less functionality than is described. For example, one or more of components 124, 126, 128, 130, and/or 132 may be eliminated, and some or all of its functionality may be provided by other ones of components 124, 126, 128, 130, and/or 132. As another example, processor(s) 136 may be configured to execute one or more additional modules that may perform some or all of the functionality attributed below to one of components 124, 126, 128, 130, and/or 132.

Data source database server 210 communicates with server gateway 120 and stores information regarding the particular data source from which the matter and sidebands are selected.

Matter database server 230 communicates with server gateway 120 and stores information regarding the records that comprise the matter.

Machine learning dataset database server 240 communicates with server gateway 120 and stores information regarding the sidebands and datasets that are used in the training of the faceted models.

Without wishing to be limited in any way, it should be noted that a machine learning model, trained as described above, is required to be able to handle the massive amounts of data that need to be reviewed and analyzed for a typical matter. For example, a single matter to be analyzed may relate to a company or organization which has a very large digital footprint across multiple data sources. These multiple data sources relate to multiple communication media as described above, and may include chat and messaging platforms, email, social media, and direct messaging as described above. A typical dataset can span up to a decade, including over 500,000 individual channels, and tens of millions of individual messages. There are often thousands of users for a given dataset to be analyzed, including bot users.

FIGS. 2A to 2D illustrate a system using multiple servers for training machine learning models using hybrid datasets. FIG. 2A illustrates a data ingest system for processing data, in accordance with one or more implementations. In FIG. 2A, matter ingest server 120 communicates with user computational device 120 (not shown) via a computer network 116 (not shown). Matter ingest server 120 receives user instructions and other information from user computational device 120 (not shown) and sends information to user computational device 120 (not shown).

Matter ingest server 120 also communicates via a computer network 116 (not shown) with one or more database servers, such as data source database server 210, matter database server 230, and machine learning dataset database server 240. A database server is a server which uses a database application that provides database services to other computer programs or to computers, as defined by the client-server model.

Data source database server 210 may include electronic storage 212, one or more processor(s), one or more databases, and/or other components. Data source database server 210 stores information regarding records from the wider data source. These records preferably include all messages that appear in the matter and the sidebands.

Matter database server 230 may include electronic storage 232, one or more processor(s), one or more databases, and/or other components. Matter database server 230 stores information regarding the records from the data source which are selected to be included in the matter, including any related metadata.

Machine learning dataset database server 240 may include electronic storage 242, one or more processor(s), one or more databases, and/or other components. Machine learning dataset database server 240 stores information regarding the records from the data source which are selected to be included in the sidebands, preferably including any related metadata, and the datasets created from these sidebands, preferably including any related metadata.

FIG. 2B illustrates a hybrid dataset creation system, in accordance with one or more implementations. In FIG. 2B, hybrid dataset creation server 240 communicates via a computer network 116 (not shown) with machine learning dataset database server 240. Hybrid dataset creation server 250 may include an electronic storage (not shown), one or more process(s) (not shown), and/or other components. Hybrid data creation server 250 creates a hybrid dataset that is stored via machine learning dataset database server 240, where the hybrid dataset may be used to create a faceted model.

FIG. 2C illustrates a hybrid model training system, in accordance with one or more implementations. In FIG. 2C, machine learning model trainer 260 receives data, such as hybrid dataset, from the machine learning dataset database server 240. Machine learning model trainer then trains a machine learning model using the hybrid dataset to generate faceted models to analyze records from one or more data sources. The data sources may include collaboration platforms, such as Slack or Microsoft Teams. After generating one or more faceted models, machine learning model trainer 260 sends the faceted models to machine learning model server 270, which stores the faceted models in one or more databases.

FIG. 2D illustrates a hybrid model application system, in accordance with one or more implementations. In FIG. 2D, matter ingest server 220 communicates via a computer network 116 with matter database server 230 and machine learning model server 280.

FIG. 3A illustrates a method 300A for separating documents into matter and sidebands, in accordance with one or more implementations. The operations of method 300A presented below are intended to be illustrative. In some implementations, method 300A may be accomplished with one or more additional operations not described, and/or without one or more of the operations discussed. Additionally, the order in which the operations of method 300A are illustrated in FIG. 3A and described below is not intended to be limiting.

An operation 302 may include reading one or more documents from the data source. Operation 302 may be performed by one or more hardware processors configured by machine-readable instructions including a component that is the same as or similar to data source database server 210, in accordance with one or more implementations.

An operation 304 may include applying a matter selection criterion to the documents read from the data source. The matter selection criteria may comprise (1) documents that match all selection criteria, (2) documents that match all but one selection criteria, or (3) documents that match fewer than all but one selection criteria. Operation 304 may be performed by one or more hardware processors configured by machine-readable instructions including a component that is the same as or similar to Matter Ingest Server 220, in accordance with one or more implementations.

An operation 306 may include identifying documents that match all selection criteria. Then, at operation 308, those documents are saved to the matter.

An operation 310 may include identifying documents that match all but one selection criteria. Then, at operation 312, those documents are saved to the matter or attempted to be saved to the matter.

An operation 314 may include identifying documents that match fewer than all selection criteria but one selection. Then, at operation 316, those documents are saved to the matter or attempted to be saved to the matter.

Operations 306, 310, and 314 may be performed by one or more hardware processors configured by machine-readable instructions including a component that is the same as or similar to Matter Ingest Server 220, in accordance with one or more implementations.

Operation 308 may be performed by one or more hardware processors configured by machine-readable instructions including a component that is the same as or similar to Matter Database Server 230, in accordance with one or more implementations.

Operations 312 and 316 may be performed by one or more hardware processors configured by machine-readable instructions including a component that is the same as or similar to Machine Learning Dataset Database 240, in accordance with one or more implementations.

FIG. 3B illustrates a method 300B for separating documents into sidebands, in accordance with one or more implementations. The operations of method 300B presented below are intended to be illustrative. In some implementations, method 300B may be accomplished with one or more additional operations not described, and/or without one or more of the operations discussed. Additionally, the order in which the operations of method 300B are illustrated in FIG. 3B and described below is not intended to be limiting.

An operation 342 may include reading one or more documents from the data source. Operation 302 may be performed by one or more hardware processors configured by machine-readable instructions including a component that is the same as or similar to data source database server 210, in accordance with one or more implementations.

An operation 344 may include applying a matter selection criterion to the documents read from the data source. The matter selection criteria may comprise (1) documents that match all but one selection criteria or (2) documents that match fewer than all but one selection criteria. Operation 344 may be performed by one or more hardware processors configured by machine-readable instructions including a component that is the same as or similar to Matter Ingest Server 220, in accordance with one or more implementations.

An operation 350 may include identifying documents that match all but one selection criteria. Then, at operation 352, those documents are saved to the matter or attempted to be saved to the matter.

An operation 360 may include identifying documents that match fewer than all selection criteria but one selection. Then, at operation 362, those documents are saved to the matter or attempted to be saved to the matter.

Operations 350 and 360 may be performed by one or more hardware processors configured by machine-readable instructions including a component that is the same as or similar to Matter Ingest Server 220, in accordance with one or more implementations.

Operations 352 and 362 may be performed by one or more hardware processors configured by machine-readable instructions including a component that is the same as or similar to Machine Learning Dataset Database 240, in accordance with one or more implementations.

FIG. 3C illustrates a method 300C for populating sidebands documents, in accordance with one or more implementations. The operations of method 300C presented below are intended to be illustrative. In some implementations, method 300C may be accomplished with one or more additional operations not described, and/or without one or more of the operations discussed. Additionally, the order in which the operations of method 300C are illustrated in FIG. 3C and described below is not intended to be limiting.

In some implementations, method 300C may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300C in response to instructions stored electronically on an electronic storage medium. The one or more processing devices may include one or more devices configured through hardware, firmware, and/or software to be specifically designed for execution of one or more of the operations of method 300C.

An operation 372 may include receiving documents for ingest to sidebands. Operation 372 may be performed by one or more hardware processors configured by machine-readable instructions including a component that is the same as or similar to Matter Ingest Server 220, in accordance with one or more implementations.

An operation 374 may include throwing a random number to determine whether a trial fails or succeeds. If the trial fails, then method 300C stops at operation 380. If the trial succeeds, then method 300C continues at operation 390 and a message is stored to the sideband database at operation 392.

Operation 374 may be performed by one or more hardware processors configured by machine-readable instructions including a component that is the same as or similar to Matter Ingest Server 220, in accordance with one or more implementations.

Operation 380 may be performed by one or more hardware processors configured by machine-readable instructions including a component that is the same as or similar to Matter Ingest Server 220, in accordance with one or more implementations.

Operation 390 may be performed by one or more hardware processors configured by machine-readable instructions including a component that is the same as or similar to Matter Ingest Server 220, in accordance with one or more implementations.

Operation 392 may be performed by one or more hardware processors configured by machine-readable instructions including a component that is the same as or similar to Machine Learning Dataset Database 240, in accordance with one or more implementations.

FIG. 4A illustrates a method 400A for creating a hybrid dataset with substitution, in accordance with one or more implementations. The operations of method 400A presented below are intended to be illustrative. In some implementations, method 400A may be accomplished with one or more additional operations not described, and/or without one or more of the operations discussed. Additionally, the order in which the operations of method 400A are illustrated in FIG. 4A and described below is not intended to be limiting.

An operation 402 may include reading a common dataset from a database, such as machine learning dataset database electronic storage 242, or from a database server, such as machine learning dataset database server 240. The dataset comprises background records. Operation 372 may be performed by one or more hardware processors configured by machine-readable instructions including a component that is the same as or similar to Matter Ingest Server 220, in accordance with one or more implementations.

An operation 404 may include reading the primary sideband dataset from a database, such as machine learning dataset database electronic storage 242, or from a database server, such as machine learning dataset database server 240. Operation 404 may be performed by one or more hardware processors configured by machine-readable instructions including a component that is the same as or similar to hybrid dataset creation server 250, in accordance with one or more implementations.

An operation 406 may include randomly removing N background records from the common dataset. Operation 406 may be performed by one or more hardware processors configured by machine-readable instructions including a component that is the same as or similar to hybrid dataset creation server 250, in accordance with one or more implementations.

An operation 408 may include randomly removing N background records from the sideband dataset. Operation 408 may be performed by one or more hardware processors configured by machine-readable instructions including a component that is the same as or similar to hybrid dataset creation server 250, in accordance with one or more implementations.

An operation 410 may include substituting N background records randomly removed from the common dataset with N selected records from the sidebar dataset. As a result, a hybrid dataset is created by combining N selected records with the common dataset from operation 402 less N background records. Operation 410 may be performed by one or more hardware processors configured by machine-readable instructions including a component that is the same as or similar to hybrid dataset creation server 250, in accordance with one or more implementations.

FIG. 4B illustrates a method 400B for creating a hybrid database with addition, in accordance with one or more implementations. The operations of method 400B presented below are intended to be illustrative. In some implementations, method 400B may be accomplished with one or more additional operations not described, and/or without one or more of the operations discussed. Additionally, the order in which the operations of method 400B are illustrated in FIG. 4B and described below is not intended to be limiting.

An operation 422 may include reading a common dataset from a database, such as machine learning dataset database electronic storage 242, or from a database server, such as machine learning database server 240. The dataset is background records. Operation 422 may be performed by one or more hardware processors configured by machine-readable instructions including a component that is the same as or similar to hybrid dataset creation server 250, in accordance with one or more implementations.

An operation 424 may include reading the primary sideband dataset from a database, such as machine learning dataset database electronic storage 242, or from a database server, such as machine learning database server 240. Operation 404 may be performed by one or more hardware processors configured by machine-readable instructions including a component that is the same as or similar to hybrid dataset creation server 250, in accordance with one or more implementations.

An operation 426 may include randomly selecting N records from the sideband dataset. Operation 426 may be performed by one or more hardware processors configured by machine-readable instructions including a component that is the same as or similar to hybrid dataset creation server 250, in accordance with one or more implementations.

An operation 428 may include adding N selected records from the sideband dataset to the common dataset in operation 422, resulting in a hybrid dataset. Operation 428 may be performed by one or more hardware processors configured by machine-readable instructions including a component that is the same as or similar to hybrid dataset creation server 250, in accordance with one or more implementations.

An operation 428 may include adding N selected records to, or removing N selected records from, the common dataset in operation 422, according to a size of the common dataset, relative to an original training dataset size for the AI (machine learning) model. For example, if the common dataset is much larger than the original training dataset size, records may need to be removed.

An operation 470 may include saving the hybrid dataset to a database, such as a dataset database. Operation 470 may be performed by one or more hardware processors configured by machine-readable instructions including a component that is the same as or similar to hybrid dataset creation server 250, in accordance with one or more implementations.

In some implementations, method 400A and 400B may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400A and/or of method 400B in response to instructions stored electronically on an electronic storage medium. The one or more processing devices may include one or more devices configured through hardware, firmware, and/or software to be specifically designed for execution of one or more of the operations of method 400A and/or of method 400B.

FIG. 5 illustrates a method for training a faceted model, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

An operation 502 may include reading the hybrid dataset from the dataset database. Operation 502 may be performed by one or more hardware processors configured by machine-readable instructions including a component that is the same as or similar to machine learning model trainer 260, in accordance with one or more implementations.

An operation 504 may include loading the machine learning pipeline with the hybrid dataset, which is used to train the machine learning faceted model. Operation 504 may be performed by one or more hardware processors configured by machine-readable instructions including a component that is the same as or similar to machine learning model trainer 260, in accordance with one or more implementations.

An operation 506 may include training the machine learning faceted model using the hybrid dataset. Operation 506 may be performed by one or more hardware processors configured by machine-readable instructions including a component that is the same as or similar to machine learning model trainer 260, in accordance with one or more implementations.

An operation 508 may include saving the trained faceted model to a database, such as models database. Operation 508 may be performed by one or more hardware processors configured by machine-readable instructions including a component that is the same as or similar to machine learning model storage server 270, in accordance with one or more implementations.

FIG. 6 illustrates a method for running a faceted model for a matter, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include initializing the pipeline for matter. Operation 602 may be performed by one or more hardware processors configured by machine-readable instructions including a component that is the same as or similar to matter ingest server 220, in accordance with one or more implementations.

An operation 604 may include initializing the machine learning pipeline. Operation 604 may be performed by one or more hardware processors configured by machine-readable instructions including a component that is the same as or similar to machine learning model execution server 280, in accordance with one or more implementations.

An operation 606 may include loading the hybrid model from models database. Operation 606 may be performed by one or more hardware processors configured by machine-readable instructions including a component that is the same as or similar to machine learning model storage server 270, in accordance with one or more implementations.

An operation 608 may include running the pipeline for matter with a custom hybrid model. Operation 608 may be performed by one or more hardware processors configured by machine-readable instructions including a component that is the same as or similar to matter ingest server 220, in accordance with one or more implementations.

An operation 610 may include updating the records with the hybrid model. Operation 604 may be performed by one or more hardware processors configured by machine-readable instructions including a component that is the same as or similar to machine learning model execution server 280, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for a training a machine learning model with a hybrid dataset, comprising:
   a training server;
   a matter database server;
   a data source database server; and
   a computer network, wherein:
   said training server, said matter database server and said data source database server are in communication through said computer network;
   said training server comprises a hybrid dataset engine and a machine learning model engine;
   said hybrid dataset engine constructs said hybrid dataset from data stored in said matter database server and said data source database server;
   said machine learning model engine trains said machine learning model according to said hybrid dataset, to form a faceted machine learning model;
   said hybrid dataset is constructed according to exclusionary criteria, such that said faceted machine learning model analyzes data after training that is not in said hybrid dataset;
   said matter database comprises a plurality of records to be analyzed by said faceted machine learning model;
   said records are not present in said hybrid dataset; and
   said faceted machine learning model analyzes said records to determine a content of said records.

2. The system of claim 1, wherein said hybrid dataset engine constructs said hybrid dataset by removing a number N of records from data source database server, selecting the same number N of records from the matter database server, and replacing said N records from data source database server with the N records from said matter database server to create said hybrid dataset.

3. The system of claim 1, wherein said hybrid dataset engine constructs said hybrid dataset by adding a number N of records from said matter database server to said records of said data source database server.

4. The system of claim 3, wherein said hybrid dataset engine selects data from said matter database server according to one or more matter filtration criteria.

5. The system of claim 4, wherein said matter filtration criteria comprises a filtration selected from the group consisting of time, channel, subject matter, and person.

6. The system of claim 5, wherein said channel comprises records within a particular communication medium, between communication media or a combination thereof.

7. The system of claim 6, wherein said communication media is selected from the group consisting of chat and messaging software, emails, letters sent on paper or other physical media, and recordings and/or transcripts of voice communication.

8. The system of claim 7, wherein said communication media permits channels, group messages and/or threads, and wherein said filtration is further based according to one or more of said channels, message groups and/or threads.

9. The system of claim 5, wherein said matter filtration criteria are exclusionary, such that data to be included in analysis of said matter by said faceted machine learning model are not included in said hybrid dataset.

10. The system of claim 9, wherein said server further comprises a matter ingestion engine and wherein said matter ingestion engine applies said one or more matter filtration criteria.

11. The system of claim 10, wherein;

said matter ingestion engine divides records from said matter database server according to said one or more matter filtration criteria, said records are divided into a plurality of groups, including at least one group of records meeting said one or more matter filtration criteria, at least one group of records meeting a majority of said one or more matter filtration criteria, and at least one group of records meeting a minority of said one or more matter filtration criteria;

said group of majority records form a primary sideband and said group of minority records form a secondary sideband; and said hybrid dataset engine selects at least some records from said primary sideband.

12. The system of claim 11, wherein said hybrid dataset engine selects at least some records from said secondary sideband.

13. The system of claim 5, wherein said hybrid dataset engine further randomly selects data from within data stored at said matter database server that is selected according to one or more matter filtration criteria.

14. The system of claim 3, wherein said hybrid dataset engine selects data from said matter database server at random.

15. The system of claim 1, wherein said hybrid dataset engine constructs said hybrid dataset by adding or removing a number N of records from said matter database server to said records of said data source database server, according to a size of dataset available at said matter database server, relative to an original training dataset size for said faceted machine learning model.

16. The system of claim 1, wherein said faceted machine learning model flags content that is illegal, unethical, against company policy or a combination thereof; and wherein said faceted machine learning model outputs a warning in regard to said flagged content.

17. The system of claim 16, further comprising a user computational device, operating a user app interface, in communication with said faceted machine learning model through said computer network; wherein said records are analyzed by said faceted machine learning model according to a request through said user app interface.

18. The system of claim 17, wherein said request is made for real time record analysis.

19. The system of claim 17, wherein said request is for ongoing monitoring of records generated by one or more communication media.

20. The system of claim 17, further comprising a server gateway in communication with said training server, said matter database server, and said data source database server; wherein said server gateway operates said faceted machine learning model.

* * * * *